Figure 1:
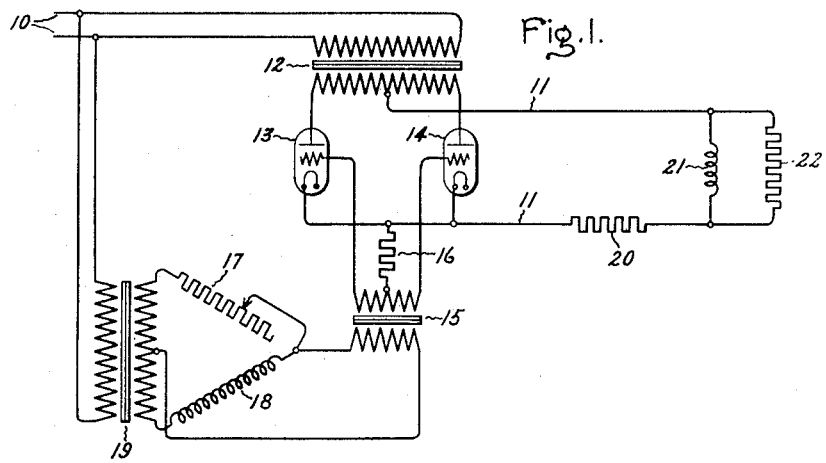

Dec. 12, 1933.  H. W. LORD  1,939,456

ELECTRIC VALVE RECTIFYING SYSTEM

Filed Dec. 31, 1931

Inventor:
Harold W. Lord,
by *Charles V. Allen*
His Attorney.

Patented Dec. 12, 1933

1,939,456

UNITED STATES PATENT OFFICE 1,939,456

ELECTRIC VALVE RECTIFYING SYSTEM

Harold W. Lord, Schenectady, N. Y., assignor to General Electric Company, a corporation of New York Application December 31, 1931
Serial No. 584,077

5 Claims. (Cl. 175—363)

My invention relates to electric valve rectifying systems and more particularly to such systems in which the average voltage of the direct current circuit may be varied by controlling the conductivity of an electric valve.

Heretofore there have been proposed numerous rectifying systems including electric valves in which the average voltage of the direct current circuit may be controlled by controlling the conductivity of the electric valves, as for example, by utilizing grid controlled electric valves and applying to the grids an alternating potential variable in phase with respect to the anode potential of the valves, or by varying the magnitude of a unidirectional grid potential, or by any other well known means, thus delaying the point in each half cycle of positive anode potential at which a valve is made conductive. It has been found that, in electric valve rectifying systems comprising an inductive load circuit, the control of the average voltage of the direct current circuit may, under certain conditions, be discontinuous. More particularly, it has been found that, over the initial range of operation, the control is uniform up to a predetermined point dependent upon the inductance of the load circuit, at which point any slight change in the control potential causes a discrete jump in the voltage of the load circuit, while from that point on the control is again uniform. It has been found that this discontinuity in the control characteristics of the rectifier is occasioned by the sudden drop in the anode voltage of a nonconductive electric valve when the other electric valve becomes non-conducting.

It is an object of my invention, therefore, to provide an improved electric valve rectifying system which will overcome the above mentioned disadvantages of the arrangements of the prior art, which will be simple and reliable in operation.

It is another object of my invention to provide an improved electric valve rectifying system in which the average voltage of the direct current circuit may be uniformly controlled over the entire range of operation.

It is a further object of my invention to provide an improved electric valve rectifying system by means of which the average voltage of the direct current circuit may be controlled and in which there are no discontinuities in the control characteristics of the apparatus.

In accordance with my invention an inductive direct current load circuit is connected to be energized through a conventional full wave rectifying system and the rectifying valves are provided with control grids by means of which the average voltage of the direct current circuit may be controlled in any well known manner. Any inductance in the direct current circuit is shunted with resistance. With this arrangement it has been found that, when current has been interrupted in one of the electric valves, the magnetic energy stored in the reactance maintains a current through it and the parallel connected resistor and thus maintains a voltage across this reactor to prevent a sudden drop in the anode potential of the nonconductive electric valve upon the interruption of current in the other valve.

Figure 2:
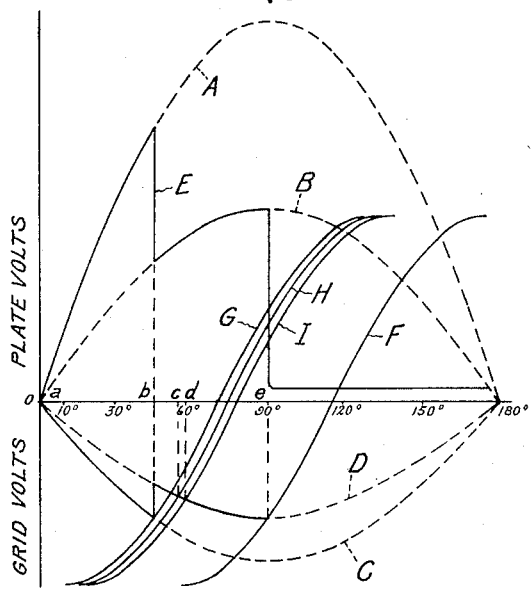
Figure 3:
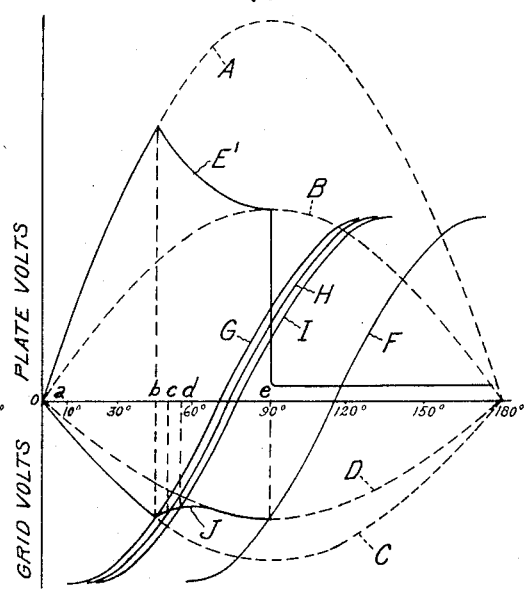

For a better understanding of my invention, together with other and further objects thereof, reference is had to the following description taken in connection with the accompanying drawing, and its scope will be pointed out in the appended claims. Fig. 1 of the drawing illustrates diagrammatically one embodiment of my invention in which the average potential of a direct current load circuit is controlled by applying the electric valve grids an alternating potential variable in phase, while Figs. 2 and 3 represent certain operating characteristics of the apparatus of Fig. 1 to aid in the understanding of my invention.

Referring now to Fig. 1 of the drawing, there is illustrated an arrangement for transmitting energy from an alternating current circuit 10 to a direct current load circuit 11. This arrangement includes a transformer 12 and electric valves 13 and 14 connected in a conventional manner to obtain full wave rectification. Electric valves 13 and 14 are each provided with an anode, a cathode, and a control grid and are preferably of the discontinuous control type, the best known examples of which are vapor electric discharge valves. By the term "discontinuous control electric valve" I refer to that type of valve in which the starting of current in the valve is determined by the potential upon its control grid, but in which the current flowing in the valve can be interrupted only by reducing its anode potential below the critical value. The grids of the valves 13 and 14 are connected to their common cathode circuit through opposite halves of the secondary winding of a grid transformer 15 and a current limiting resistor 16. The grid transformer 15 may be energized in any suitable manner for securing the desired excitation of the grids of the valves 13 and 14, although I have shown by way of example an impedance phase shifting circuit comprising a variable resistor 17 and a reactor 18 connected across the secondary winding of a transformer 19, the primary winding of which is energized from the circuit 10. The primary winding of the transformer 15 is preferably connected between the electrical midpoint of the secondary winding of the transformer 19 and the junction between resistor 17 and reactor 18. The direct current circuit 11 is connected to energize a load device 20 and, in case this device is non-inductive, a reactor 21 is connected in series therewith. In accordance with my invention, a resistor 22 is connected in parallel to reactor 21 to maintain a voltage in the load circuit when current is flowing in neither of the electric valves, and thus to prevent a sudden decrease in the anode potential of one of the electric valves when current is interrupted in the other, as will be explained more fully hereinafter.

The general principles of operation of a grid controlled full wave rectifier will be well understood by those skilled in the art, so that a detailed explanation is not deemed necessary. In brief, assuming that the valves 13 and 14 are of the discontinuous control type, if the grid potential of the valves 13 and 14 is in phase with the anode potential of these valves, each valve will be conductive during a complete half cycle of positive anode potential and the unidirectional current supplied to the circuit 11 will flow alternately in the valves 13 and 14. In case the phase of the grid potential is retarded with respect to the anode potential, each valve will be rendered conductive at some intermediate point in each half cycle of positive anode potential, and, neglecting any inductance in the direct current circuit, will flow only for the remaining portion of each half cycle, thus reducing the average potential of the direct current circuit. Since the direct current circuit includes inductance, however, the current in each electric valve will not be interrupted when the alternating potential reverses polarity, but will continue to flow for a portion of the next successive half cycle against the electromotive force of the supply circuit, the necessary potential required to maintain this current being supplied by the inductance, as is well understood by those skilled in the art. Neglecting the effect of the resistance 22 and assuming that electric valve 13 has been conducting the preceding half cycle, the operating characteristics of electric valve 14 are as illustrated in Fig. 2. In this figure the dotted curve A represents the full secondary potential of the transformer 12; the curve B, the potential between the midpoint and one end terminal of the transformer winding; the curve C, the critical grid potential of the electric valve 14 corresponding to the anode potential A; and the curve D, the critical grid potential corresponding to an anode potential represented by the curve B. Assuming that electric valve 13 has been conducting during the preceding half cycle, the reactance 21 will maintain this current during the initial portion of this particular half cycle, and the potential of the cathode of the valve 14 will be substantially the same as the left hand terminal of the secondary winding of the transformer 12; that is, the full potential of the transformer 12 will be impressed across the valve 14. This is represented by the initial portion of the full line curve E. At the point b, it will be assumed that the counter-electromotive force of the secondary winding of the transformer 12 is sufficient to neutralize the reactive electromotive force of the reactor 21 and that the current in the valve 13 is interrupted. With no current flowing in the circuit and both valves non-conductive, the potential of the cathode of the valve 14 becomes equal to that of the midpoint of the secondary winding of the transformer 12, so that the potential across the valve 14 suddenly drops to approximately one half the initial value, as indicated in the full line curve E. At the same time, it will be noted that the critical grid potential of the valve 14 changes from the curve C to the curve D. It will be assumed that the alternating potential supplied to the grid of the valve 14 from the impedance phase shifting circuit is retarded something more than ninety degrees and is represented by the curve F, which intersects the curve of critical grid potential at the point e. At this point the valve 14 becomes conductive and its anode potential drops to a small fixed value determined by the arc drop in the valve. If now the grid potential be advanced so that it intersects the curve of critical grid potential at the point b, as represented by the curve G, the valve 14 will be rendered conductive at this instant. The curves H and I represent the grid potential when retarded in increments of approximately three electrical degrees from the curve G. Thus it is seen that the curve H intersects the critical grid potential curve at the instant c and the curve I intersects this curve at the point d. That is, for a very small lagging of the grid potential from the curve G, the instant at which the valve is made conductive is delayed by the interval b—c, while for a subsequent equal lagging of the grid potential as represented by the curve I, the time at which the valve is rendered conductive is delayed only for the interval c—d. In other words, equal variations in the control potential produce unequal variations in the average potential of the direct current circuit at this particular point. Obviously, this discontinuity occurs whether the grid potential is being retarded to decrease the potential of the direct current circuit, or whether it is being advanced to increase its potential. With the resistor 22 connected in parallel to the reactor 21, however, when the current in the valve 13 is interrupted at the instant b, the electromagnetic energy stored in this reactor maintains a current through the resistor 22 which decreases with a logarithmic decrement, as is well understood by those skilled in the art. This circulating current in the reactor 21 and resistor 22 maintains a voltage across the resistor 22 so that the potential appearing across electric valve 14 is now represented by the curve E' of Fig. 3, in which similar curves are designated by corresponding reference characters. It is seen that the critical grid characteristic of the valves, represented by the full line curve J, is now so modified that equal changes in the control potential from the point B effect substantially equal changes in the point in the cycle at which the valve becomes conductive, as represented by the instants b, c and d. In this manner it is possible to secure a uniform control over the average potential of the direct current circuit 11 throughout the operating range of the apparatus.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. An electric valve rectifying system comprising a source of alternating current, a direct current load circuit, a pair of discontinuous control electric valves interconnecting said circuits, means for rendering each of said valves conductive at an intermediate point in each half cycle of its positive anode potential, a reactance device included in said load circuit for maintaining current in each valve for an interval after the alternating supply potential has reversed polarity, and means for producing a potential in said load circuit upon the interruption of current in either of said valves while the other valve is non-conductive to prevent a sudden decrease in anode potential in said other valve.

2. An electric valve rectifying system comprising a source of alternating current, a direct current load circuit, a pair of discontinuous control electric valves interconnecting said circuits, a reactance device included in said load circuit, means for rendering each of said valves conductive at an intermediate point in each half cycle of its positive anode potential, and means for minimizing discontinuities in the anode potential of each valve during its nonconductive periods comprising means for maintaining a potential across said reactance device during intervals when current is flowing in neither valve.

3. An electric valve rectifying system comprising a source of alternating current, a direct current load circuit, a pair of grid controlled vapor electric discharge valves interconnecting said circuits, a reactance device included in said load circuit, means for impressing upon the grids of said valves alternating potentials retarded in phase with respect to their anode potentials, and means for minimizing discontinuities in the critical grid potentials of said valves comprising means for maintaining a potential across said reactance device during intervals when current is flowing in neither valve.

4. An electric valve rectifying system comprising a source of alternating current, a direct current load circuit, a pair of discontinuous control electric valves, an inductive winding energized from said alternating current circuit and provided with an electrical midpoint connected to one side of said direct current circuit and with end terminals connected to the other side of said direct current circuit through said valves, a reactance device included in said load circuit, means for rendering each of said valves conductive at an intermediate point in each half cycle of its positive anode potential, and means for preventing sudden decreases in the anode potential of either valve when the other valve becomes non-conducting comprising means for maintaining a potential across said reactance device during intervals when current is flowing in neither valve.

5. An electric valve rectifying system comprising a source of alternating current, a direct current load circuit, a pair of discontinuous control electric valves interconnecting said circuits, a reactance device included in said load circuit, means for rendering each of said valves conductive at an intermediate point in each half cycle of its positive anode potential, and means for maintaining a potential across said device during intervals when current is flowing in neither valve comprising a resistor connected in parallel to said device.

HAROLD W. LORD.